(12) United States Patent
Nafziger

(10) Patent No.: US 6,786,030 B2
(45) Date of Patent: Sep. 7, 2004

(54) ROTATING TRIMMER HEAD

(76) Inventor: Dean Nafziger, 42 WillowWay, Archbold, OH (US) 43502

( * ) Notice: Subject to any disclaimer, the term of this patent is extended or adjusted under 35 U.S.C. 154(b) by 0 days.

(21) Appl. No.: 10/236,394

(22) Filed: Sep. 5, 2002

(65) Prior Publication Data
US 2004/0045268 A1 Mar. 11, 2004

(51) Int. Cl.[7] .............................................. A01F 63/00
(52) U.S. Cl. ........................ 56/12.7; 54/17.4; 54/320.1
(58) Field of Search .............................. 56/320.1, 12.7, 56/17.4, 10.4, DIG. 15

(56) References Cited

U.S. PATENT DOCUMENTS

| | | | |
|---|---|---|---|
| 2,832,184 A | * 4/1958 | Beuerle | 56/17.2 |
| 3,183,651 A | 5/1965 | Hoefler | |
| 4,104,851 A | 8/1978 | Perry | |
| 4,573,306 A | 3/1986 | Smith et al. | |
| 5,035,107 A | 7/1991 | Scarborough | |
| 5,115,870 A | * 5/1992 | Byrne | 172/15 |
| 5,167,108 A | 12/1992 | Bird | |
| 5,303,532 A | * 4/1994 | Phillips | 56/12.7 |
| 5,396,754 A | 3/1995 | Fraley | |
| 5,471,824 A | 12/1995 | Neely | |
| 5,518,682 A | * 5/1996 | Markling et al. | 264/516 |
| 5,598,689 A | 2/1997 | Bork | |
| 5,692,572 A | 12/1997 | Cloney et al. | |
| 5,704,201 A | * 1/1998 | Van Vleet | 56/14.9 |
| 6,430,906 B1 | 8/2002 | Eddy | |
| 6,546,706 B1 | * 4/2003 | Nafziger | 56/13.7 |

* cited by examiner

Primary Examiner—Thomas B. Will
Assistant Examiner—Meredith Petravick
(74) Attorney, Agent, or Firm—Emch, Schaffer, Schaub & Porcello, Jr.

(57) ABSTRACT

The apparatus is a rotating trimmer head, commonly used with a mower deck combination, but not limited to such a combination, wherein the trimmer head is resiliently positioned with respect to the mower deck for horizontal movement with respect to the mower deck. A resilient member holds the trimmer in an extended position away from the mower deck and allows the trimmer to move to a retracted position adjacent the mower deck when the trimmer meets a fixed obstacle. The rotating head facilitates a smooth engagement between the trimmer head and the obstacle as the trimmer head moves around the obstacle. As a result, an operator may mow in a straight line and do the trimming without interfering with the mower or the main deck.

8 Claims, 6 Drawing Sheets

ROTATING TRIMMER HEAD

BACKGROUND OF THE INVENTION

Conventional lawn mowers, be they walk behind, lawn tractors and riders of all types, have long had the disadvantage of an inability to closely trim or edge around stationary objects such as trees, posts, buildings and the like. Commonly, the trimming and edging is accomplished by hand, using a string trimmer or trimming mower. Such hand edging is time consuming and physically demanding.

Particularly troublesome areas to mow are found in cemeteries. When mowing a cemetery, one has to mow around a multitude of permanent grave stones without damaging the stones. Typically, the job is completed with a string trimmer by hand. Stone placement and size differ throughout cemeteries thus creating a great deal of hand labor to properly mow and trim a cemetery.

A trim mower attachment for riding mowers is shown in U.S. Pat. No. 5,598,689, however, the trim attachment is fixed in place with respect to the horizontal cut of the mower deck and is hinged to move in the vertical plane to provide compensation for the changing contours of the mowing surface. The structure provided in the '689 patent is seriously deficient however in assisting the mower operator to closely trim around a large number of fixed obstacles such as cemetery stones and fence posts. In fact, the extent with which the trimmer is positioned outside the normal width of the mower deck forces the operator to exercise careful diligence when approaching stationary objects or risk damaging the mower.

Another trim mower attachment is disclosed in my copending patent application Ser. No. 09/641,048, filed Aug. 17, 2000 now U.S. Pat. No. 6,546,706 Apr. 15, 2003. The mower deck and trimmer combination disclosed in my patent application maintains a trimming apparatus to one side and forward of the mower deck. The trimmer is engaged to the mower deck by a pivot member defining a fixed pivot axis normal to the cutting plane of the mower deck. When the trimmer encounters an obstacle, it moves horizontally about the fixed pivot axis. The teachings of the '048 application are specifically incorporated herein by reference.

It has been discovered that, under certain operating conditions, the trimming head encounters difficulty in moving about the fixed pivot axis. For instance, if the trimming head encounters a rough surface the head has a tendency to become unstable and "dance". Also, if the trimming head moves past an obstacle and the operator reverses the drive of the apparatus, the trimming head may not move about the pivot axis properly, thus resulting in potential damage to the trimming head and mower deck.

Thus it is an object of this invention to provide a trimming head having two ranges of motion which create a natural rotation of the head while the head moves about an obstacle.

It is a further object of this invention to provide a mower deck having a rotating trimming head in combination therewith which provides a capability of trimming around stationary objects such as fences, posts, trees, walls, guard rails and the like.

Yet another object of this invention is to provide a mower deck with a rotating trimming head that flexes vertically to follow the contour of the mowing surface.

DISCLOSURE OF INVENTION

The invention provides an improved trimmer structure for use with mower decks wherein the trimmer is resiliently positioned with respect to the mower deck to have an overlapping cutting path to the cutting path of the mower deck. The trimming head includes a rotating housing which is designed to rotate about the shaft of the cutting blade. The trimmer is connected to an arm fixed to the mower deck and rotates on a fixed pivot axis normal to the cutting plane of the mower deck when encountering fixed obstacles. A resilient member maintains the trimmer in an extended position away from the mower deck, allows the trimmer to move to a retracted position adjacent the mower deck when it contacts a fixed obstacle and returns the trimmer to its extended position after the obstacle has passed. A drive for operating the trimmer is adapted to move with the trimmer. Rotation of the trimming head housing eliminates frictional interference between the trimming head and obstacle, thereby facilitating the natural tendency of the trimming head to rotate as it moves around obstacles, whether in the forward direction or the reverse direction. The rotating trimming head also flexes vertically to allow the trimmer to follow the contour of the moving surface.

As a result, an operator may mow in a straight line and trim around stationary obstacles and reverse drive without interfering with the operation of the mower deck.

DETAILED DESCRIPTION OF THE PREFERRED EMBODIMENT(S)

The structure of the rotating trimming head of the invention may variously be designed as a rotating mulching head or a rotating side discharge head. The rotating housing may be constructed of any suitable material such as metal, plastic, fiber reinforced plastic, etc. The cutting blades may be constructed of metal or plastic and may be either fixed rotationally or be swing blades. String styled cutting devices may also be employed. The cutting blades may be designed to rotate within the trimmer housing or may extend below the housing, thereby allowing the tips of the cutting blades to extend flush with the exterior circumference of the housing. While the invention is described herein as used with a trimmer/mower deck combination, it is further applicable to hand-held trimmers. The rotating head will operate as a guide for the hand-held trimmer head to speed the process of hand-held trimming.

The crux of the invention lies in the ability of the trimming head to resiliently rotate and move when it meets an immovable object, whether moving forward or in reverse. As the mower approaches an obstruction, the leading edge of the trimmer will make contact with the obstruction and a traction device located on the exterior housing of the trimmer will rotate and move the trimming head inward towards the mower deck. The trimmer will edge and trim the grass while following around the obstruction from the front to the side and back in on the other side of the obstruction with the aid of a resilient tensioner. The traction device may be a belt positioned to move on the housing or may, preferably, be a rotating housing member. Movements of the mower in a forward or reverse direction will create a rotation of the trimming head, thereby facilitating smooth movement of the head around fixed obstacles and reducing the potential for shock and damage to mower and trimmer components as well as the obstacle itself.

The trimmer can be adapted for vertical movement so that the trimmer will follow the contour of the mowing surface and flex vertically as it moves horizontally. While the embodiment described herein makes use of a hinge member to facilitate vertical flex, it is envisioned that the stabilizer arm may have some inherent flexibility so as to allow the trimmer head to follow the contour of the surface. Adjustable runners, wheels, rollers, castors, or air float maintains the trimmer head height in line with the mower deck to provide an even cut of the mower surface. The trimmer may also be of a design to fold up to allow the mower deck to fit through narrow areas and also be adapted with a simple mount for easy removal.

While it is envisioned that the rotating trimming head of this invention may be utilized with tractors, lawn tractors, push mowers, and mowers and hand-held trimmers of all designs and sizes, for the purposes of simplicity in description, the invention will be described as used with a mid-mounted lawn tractor.

Figure 1:
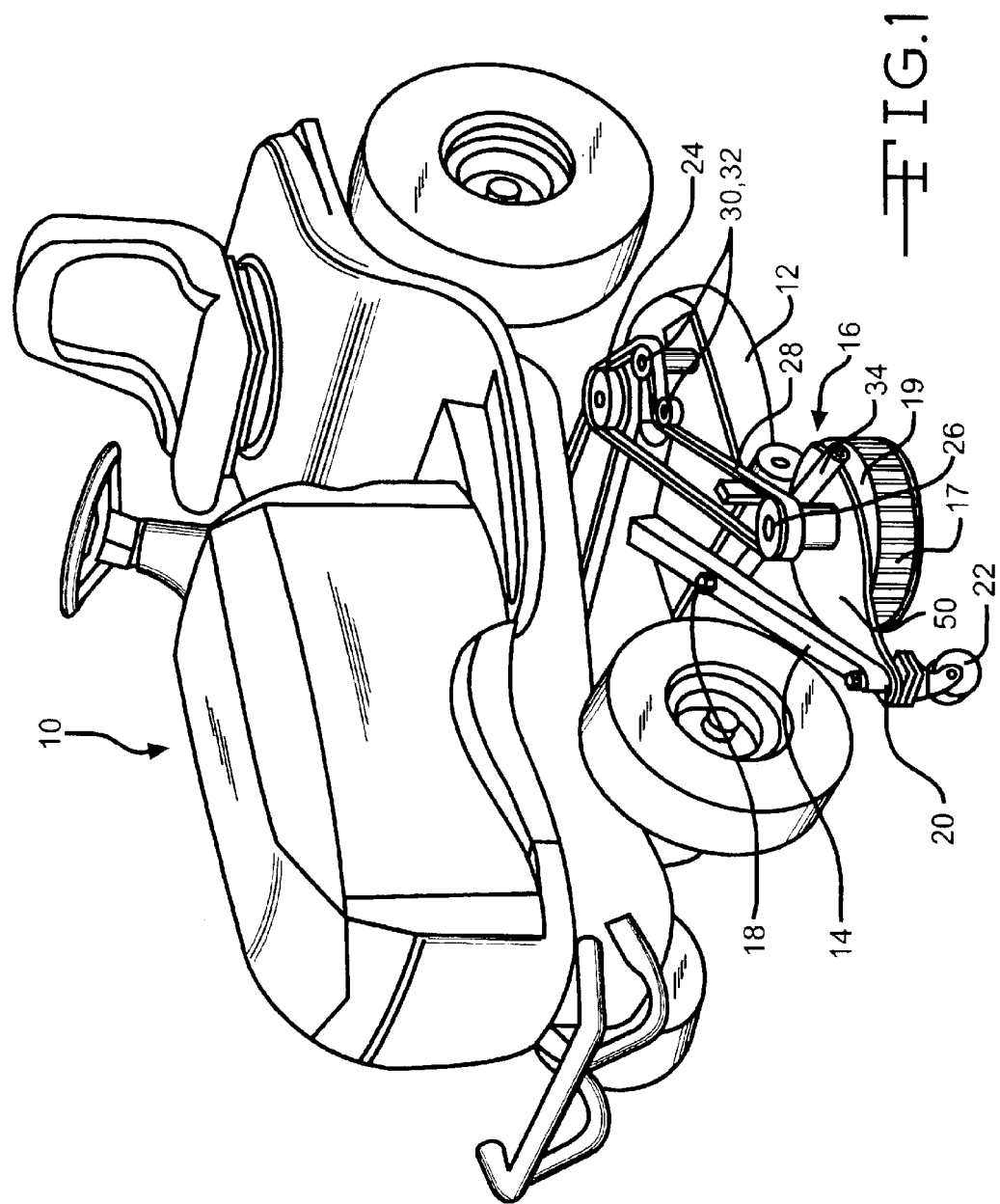
FIG. 1 is a perspective view showing the rotating trimming head of the present invention in combination with a mowing deck.

FIG. 1 shows a conventional tractor 10 with a mower deck 12 attached thereto. Arm 14 connects the trimmer head 16 to the mower deck 12. The arm 14 is bolted 18 to the mower deck 12 to allow for easy removal. A pivot mechanism or connector 20 connects the arm 14 to the trimmer 16. The trimming head 16 is maintained in an orientation that is forward and to one side of the mower deck 12. The pivot connector 20 defines a fixed pivot axis normal to the cutting plane of the mower deck 12. A wheel 22 is fixed to the arm 14 to provide stability for the trimmer 16. The trimmer 16 is driven by a belt 28 which in turn is driven by drive pulley 24 and trimmer pulley 26. Belt 28 tension is maintained by the idler pulleys 30 and 32 which allow the belt 28 to move inwardly and outwardly to compensate for the movement of the trimmer 16. Resilient arm 34 engages the arm 14 and the trimmer 16 to assist in providing horizontal stability to the trimmer. The trimmer 16 includes a traction device 17, such as a belt mounted for movement on the trimmer housing 19 or the housing 19 being mounted on bearings to rotate about the cutting blade shaft is shown generally.

Figure 2:
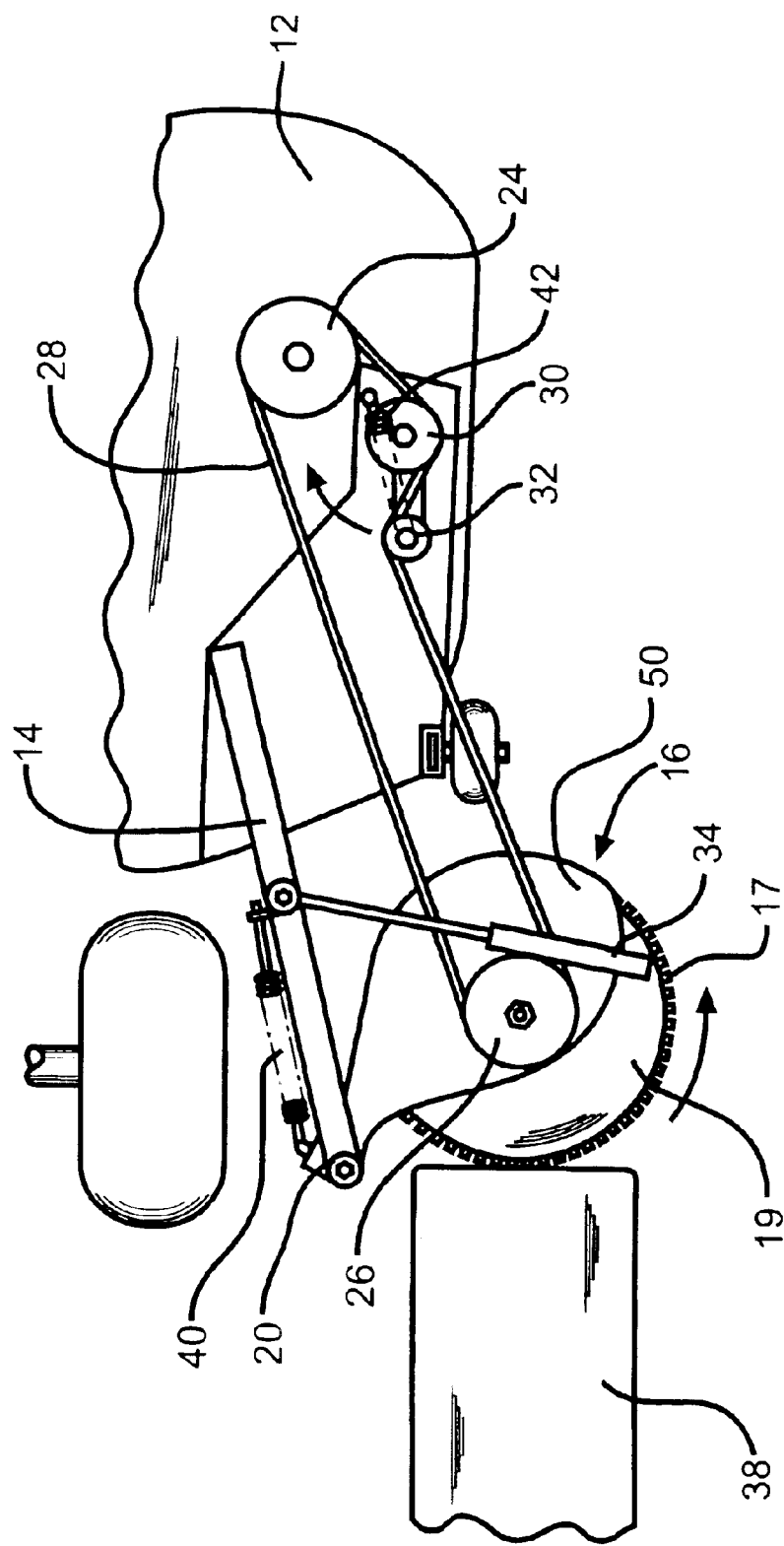
FIG. 2 is a top view, partially broken away, showing the trimming head in its extended position abutting a stationary object.
Figure 3:
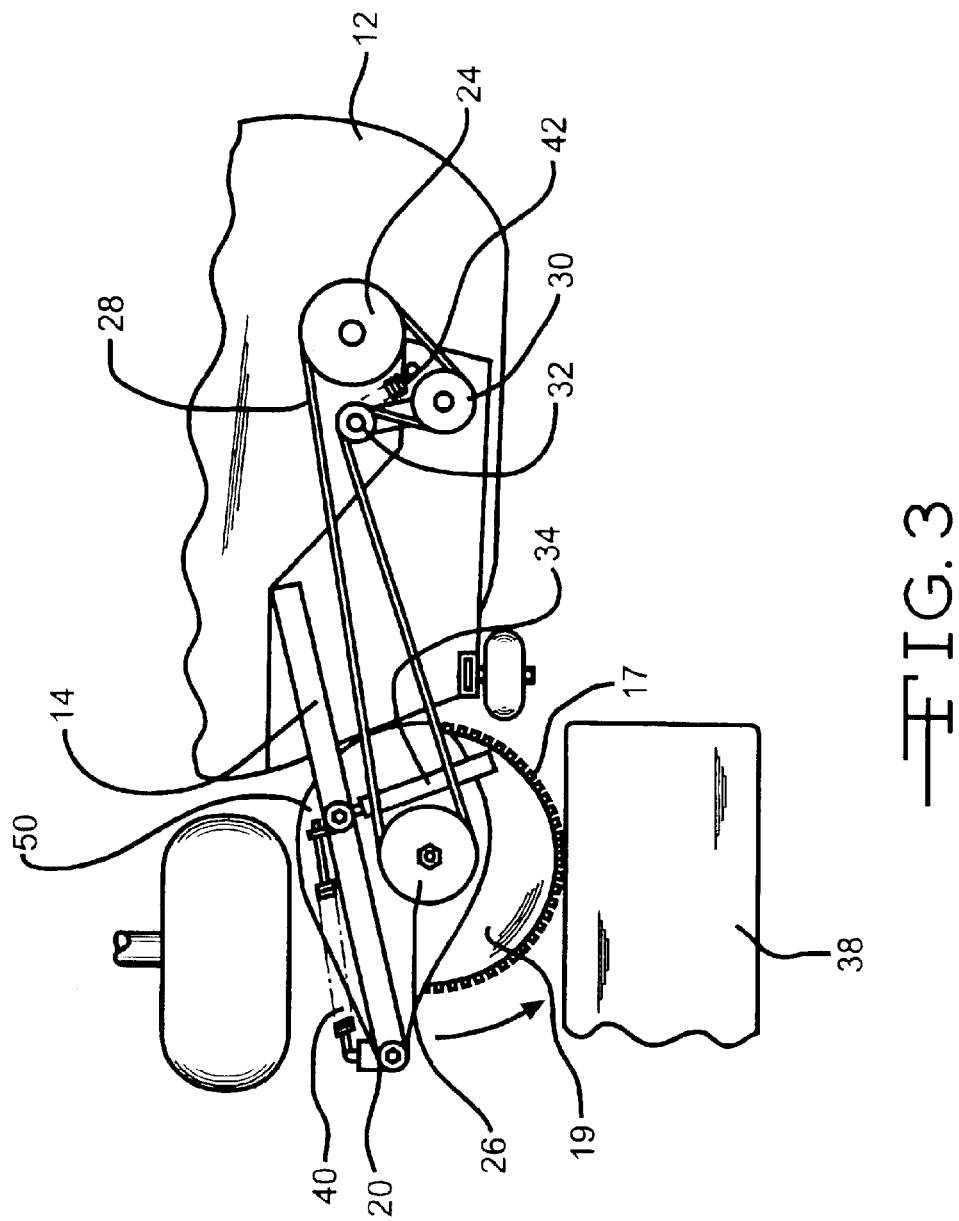
FIG. 3 is a top view, partially broken away, showing the trimming head moving about an obstacle and rotating to its retracted position.

FIGS. 2 and 3 show the trimmer head 16 in an extended and retracted position as it moves around an obstruction 38. The tension spring 40 is fixed to the trimmer 16 to continually motivate the trimmer 16 into the extended position shown in FIG. 2. The tension spring 40 may also be a telescoping hydraulic or pneumatic cylinder.

When the trimmer 16 is in a retracted position against the obstruction 38 as shown in FIG. 3, the tension spring 40 is in a compacted position and resilient arm 34 is in a closed telescoped position. Idler pulley 32 is located in a takeup position tensioned by spring 42, thereby maintaining the tension on belt 28 to accommodate the inward movement of the trimmer 16. The traction device 17 provides a rotational motion to the trimming head (in the direction indicated by the arrows) which facilitates a smooth movement of the head about the obstacle.

After the mower 10 and trimmer 16 pass the obstruction 38, the tension spring 40 and the resilient arm extend the trimmer 16 away from the mower deck and around the back edge of the obstacle 38. Thus, trimming and edging around the obstacle is accomplished while the mower deck is moving along a straight path.

Figure 4:
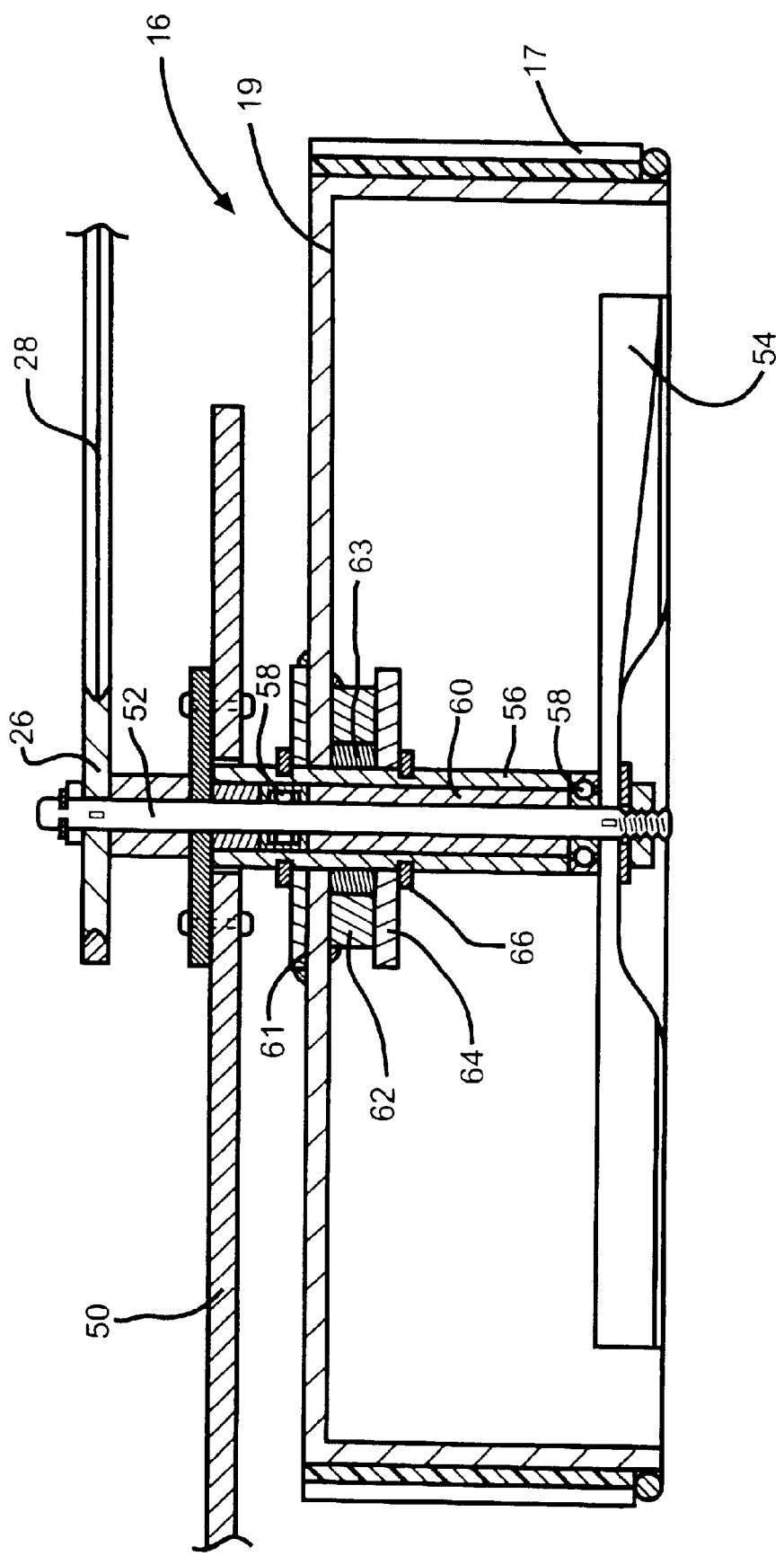
FIG. 4 is a cross-sectional view of the rotating trimming head of the present invention.

Referring now to FIG. 4, a cross-section of the preferred embodiment of the rotating trimming head 16 appears in detail. The trimming head 16 includes a base plate 50 designed to stabilize the head 16 through its engagement with fixed arm 14, pivot connector 20 and resilient arm 34, as shown in FIGS. 1–3. Base plate 50 also carries the wheel 22, and trimmer pulley 26, which is engaged by the belt 28. As shown in FIG. 4, the trimmer pulley 26 is engaged with a drive shaft 52 which, in turn, engages the cutting blades 54. The housing 19 of the trimmer head 16 is mounted for rotation on the base plate 50 through engagement with a fixed spindle housing 56 extending from the base plate 50 and encompassing the drive shaft 52. The spindle housing 56 includes bearings 58 for the drive shaft 52. Spacer 60 is positioned between spindle housing 56 and shaft 52 to maintain positioning of the bearings 58. The rotational engagement between the housing 19 and the spindle housing 56 is reinforced by plate 61, ring 62, and bearing plate 64. A bearing member 63 is located between the ring 62 and the spindle housing 56. Snap rings 66 are used to lock the plate 61, ring 62, bearing plate 64, bearing member 63, and housing 19 together for rotation about the spindle housing 56. A traction device 17 is attached to the outside circumference of the housing 19. The traction device 17 may be constructed of rubber or plastic or any other material suitable for a frictional interface with a fixed obstacle.

Figure 5:
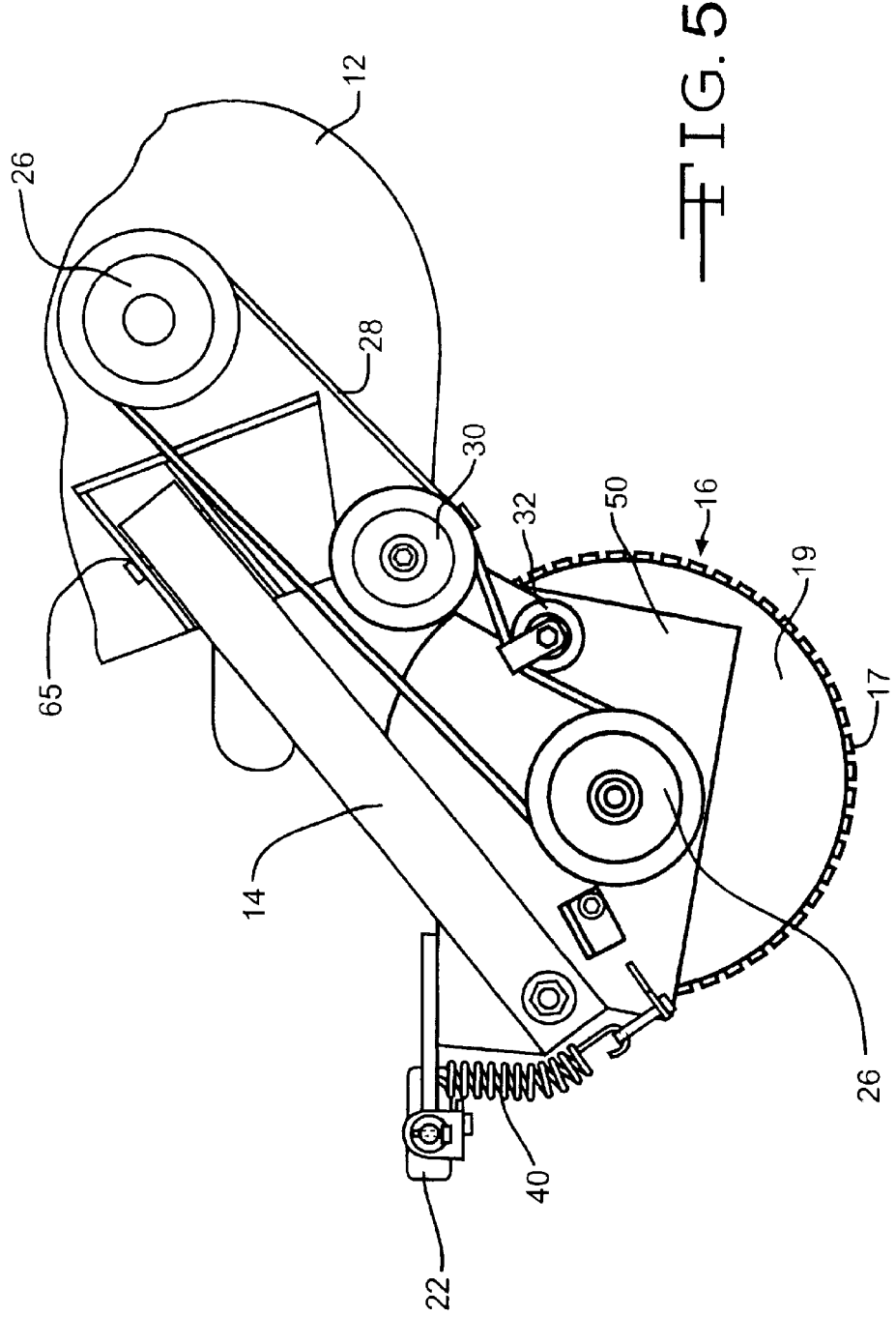
FIG. 5 is a top view, partially broken away, showing an alternative structure of the trimming head of the present invention attached to a hinged stabilizer arm.
Figure 6:
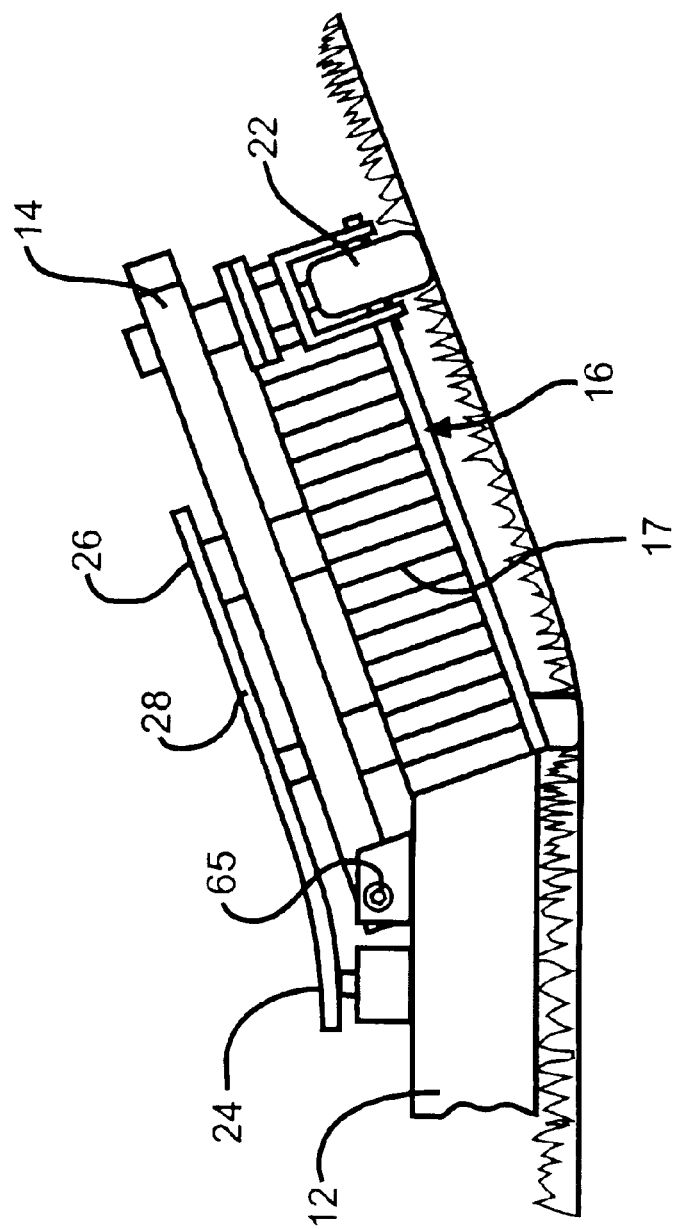
FIG. 6 is a diagramatic view of the vertical flex of the rotating trimming head of FIG. 5.

Referring now to FIGS. 5 and 6, an alternative support structure is shown for use in attaching the rotating trimmer head to a mower deck. In this alternative embodiment, the base plate 50 carries the wheel 22, trimmer pulley 26 and also the idler pulleys 30, 32. The stabilizer arm 14 extends between engagement with the base plate 50 to a hinge member 65 located on the mower deck 12. The hinge member 65 provides the ability for the arm 14 and trimming head 16 combination to flex vertically to allow the trimming head 16 to follow the contour of the mowing surface and to allow the trimming head 16 to fold upward to allow the mower to pass through narrow passages.

This description of the invention as presented herein is intended to be illustrative in nature and not necessarily limiting upon the scope and content of the following claims.

The alternative structures disclosed and discussed herein, as well as any other structures which may provide an equivalent function are fully intended to be included in the scope and content of the following claims.

I claim:

1. A mower and trimmer assembly, comprising in combination:
   a mower deck;
   the trimmer head located to one side and forward of the mower deck such that the cutting paths of the trimmer head and the mower deck overlap;
   the trimmer head including a housing member enclose a cutting member wherein the housing member has an exterior circumferential surface with a friction creating texture;
   a support member for carrying the housing member and the cutting member wherein the cutting member and the housing member are independently engaged to the support member such that the friction creating texture cause the housing member to freely rotate when encountering an obstacle;

a pivot member engaging the trimmer head with the mower deck, the pivot member defining pivot axis normal to the cutting plane of the mower deck, the pivot axis being in a fixed position forward and to one side relative to the mower deck, wherein the trimmer, while maintaining its fixed orientation relative to the mower deck, moves horizontally about the pivot axis and rotates when encountering such obstacles; and drive means for supplying power to the trimmer and the mower deck.

2. The combination of claim 1 further including a resilient member engaged with the trimmer head to bias the trimmer head to a fully extended position with respect to the mower deck and which allows the trimmer to move toward the mower deck about the pivot axis as the trimmer encounters and rotates about such obstacles.

3. The combination of claim 1 wherein the trimmer head is pivotally fixed to an arm which in turn is connected to and extends from the mower deck.

4. The combination of claim 1 wherein the drive means includes a power source for driving the mower deck and an auxiliary take-off from the mower deck to drive the trimmer head.

5. The combination of claim 1 wherein the drive means includes a first power source for the mower deck and a second power source for the trimmer head.

6. The combination of claim 4 wherein the auxiliary take-off includes a drive pulley on the mower deck, a pulley on the trimmer with a drive belt engaged therebetween and at least one idler pulley resiliently engaged with the drive belt to maintain tension in the belt as the trimmer moves about the pivot axis.

7. The combination of claim 2 further including a hinge member located on the mower deck for engagement with the arm to allow for vertical movement of the arm and trimmer head with respect to the mower deck.

8. The combination of claim 1 wherein the housing member exterior circumferential surface supports a traction device for rotating the housing member when encountering an obstacle.

* * * * *